(12) United States Patent
Hatada et al.

(10) Patent No.: US 8,687,176 B2
(45) Date of Patent: Apr. 1, 2014

(54) COLOR MEASUREMENT DEVICE AND COLOR MEASUREMENT METHOD

(75) Inventors: Kenji Hatada, Nagano (JP); Hitoshi Igarashi, Nagano (JP); Jun Ushiama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/273,716

(22) Filed: Oct. 14, 2011

(65) Prior Publication Data

US 2012/0092671 A1    Apr. 19, 2012

(30) Foreign Application Priority Data

Oct. 15, 2010  (JP) ................................ 2010-232966

(51) Int. Cl.
*G01N 21/00*    (2006.01)
(52) U.S. Cl.
USPC .......................................................... 356/72
(58) Field of Classification Search
USPC .......................................................... 356/72
See application file for complete search history.

(56) References Cited

U.S. PATENT DOCUMENTS

2008/0252948 A1*  10/2008  Onishi ......................... 358/504

FOREIGN PATENT DOCUMENTS

JP    2008-275587 A    11/2008
JP    2009-271037 A    11/2009

* cited by examiner

*Primary Examiner* — Tarifur Chowdhury
*Assistant Examiner* — Omar Nixon
(74) *Attorney, Agent, or Firm* — Global IP Counselors, LLP

(57) ABSTRACT

To press a medium using an appropriate pressing force and perform colorimetric measurement, a color measurement device for performing colorimetric measurement of a print pattern printed on a medium, the color measurement device comprising a pressing member for pressing the medium; a power source for outputting power for the pressing member to press the medium; a detecting part for detecting a pressing force on the medium; a color measurement section for performing colorimetric measurement of the print pattern; and a control part for controlling the power source so that the pressing force detected by the detecting part is equal to a predetermined pressing force, and for causing the color measurement section to perform colorimetric measurement of the print pattern printed on the medium pressed by the pressing member.

8 Claims, 8 Drawing Sheets

COLOR MEASUREMENT DEVICE AND COLOR MEASUREMENT METHOD

CROSS-REFERENCE TO RELATED APPLICATIONS

This application claims priority to Japanese Patent Application No. 2010-232966 filed on Oct. 15, 2010. The entire disclosure of Japanese Patent Application No. 2010-232966 is hereby incorporated herein by reference.

BACKGROUND

1. Technological Field

The present invention relates to a color measurement device and a color measurement method.

2. Background Technology

There exist inkjet-type printing devices that are provided with a colorimeter. In printing devices of such description, color measurement is performed in relation to colors that are based on specific standards, and results of inkjet printing on printed material are assessed using the color measurement result.

Japanese Patent Application Publication No. 2008-275587 (Patent Citation 1) is an example of the related art.

SUMMARY

Problems to be Solved by the Invention

In an instance in which an optical sensor or a similar device is used to perform color measurement on a print pattern, color measurement cannot be performed in an accurate manner if the distance between the sensor and the print pattern is not appropriate. Therefore, under such circumstances, it is preferable that the medium is pressed using an appropriate pressing force and color measurement is performed.

With the above-mentioned circumstances in view, an andvantage of the invention is to press a medium using an appropriate pressing force and perform color measurement.

Means Used to Solve the Above-Mentioned Problems

In order to achieve the above-mentioned object, a principal aspect of the invention is a color measurement device for performing colorimetric measurement of a print pattern printed on a medium, the color measurement device including:
  a pressing member for pressing the medium;
  a power source for outputting power for the pressing member to press the medium;
  a detecting part for detecting a pressing force on the medium;
  a color measurement section for performing colorimetric measurement of the print pattern; and
  a control part for controlling the power source so that the pressing force detected by the detecting part is equal to a predetermined pressing force, and for causing the color measurement section to perform colorimetric measurement of the print pattern printed on the medium pressed by the pressing member.

Other characteristics of the invention will be described in the present specifications and the accompanying drawings.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
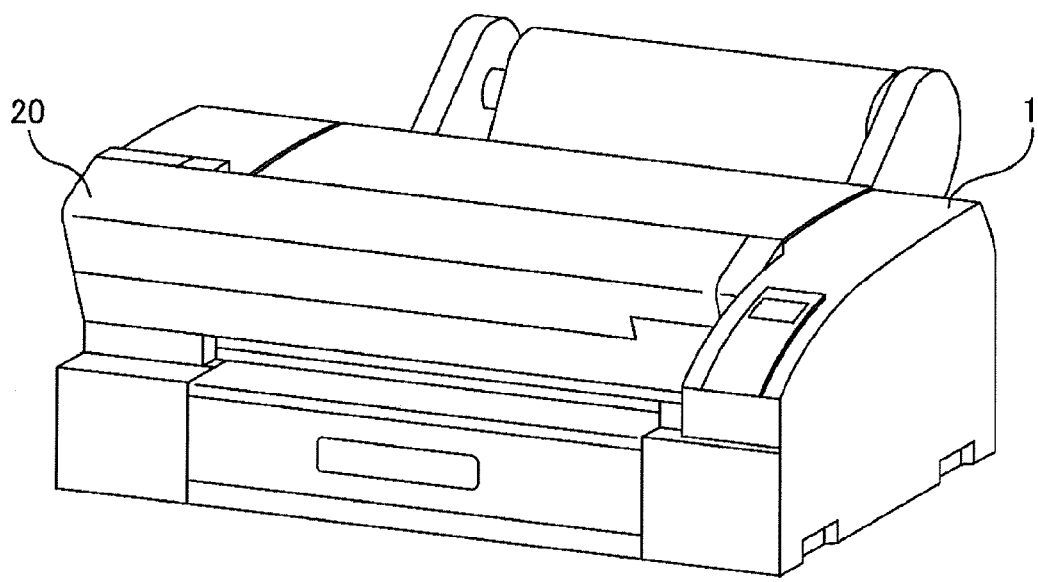
FIG. 1 is a perspective view of a printer including a color measurement device according to the present embodiment.

At least the following matter is made apparent by the present specifications and the accompanying drawings. A color measurement device for performing colorimetric measurement of a print pattern printed on a medium, the color measurement device including:
  a pressing member for pressing the medium;
  a power source for outputting power for the pressing member to press the medium;
  a detecting part for detecting a pressing force on the medium;
  a color measurement section for performing colorimetric measurement of the print pattern; and
  a control part for controlling the power source so that the pressing force detected by the detecting part is equal to a predetermined pressing force, and for causing the color measurement section to perform colorimetric measurement of the print pattern printed on the medium pressed by the pressing member. It thereby becomes possible to press the medium using an appropriate pressing force and perform colorimetric measurement.

In the color measurement device, it is preferable that the control part changes the output of the power source and causes the pressing member to press the medium; specifies an output of the power source at which the pressing force detected by the detecting part is equal to the predetermined pressing force; and records the specified output. It thereby becomes possible to adjust the pressing force during colorimetric measurement.

It is preferable that the detecting part is provided at a position opposite the pressing member. It thereby becomes possible to detect the pressure with which the detecting part is pressed by the pressing member through the medium.

The detecting part may also be provided to the pressing member. It thereby becomes possible to obtain a configuration in which the detecting part is not present at a location through which the medium passes when the pressing member is not pressing the medium.

It is preferable that the detecting part is provided on a surface where the pressing member comes into contact with the medium, and is provided to a side of the surface set apart from where the power source is disposed, in a direction along which the medium is conveyed. It thereby becomes possible to detect the pressing force at a side towards a front end of the pressing member.

It is preferable that a plurality of the detecting parts are provided in a direction that intersects a direction along which the medium is conveyed. It thereby becomes possible to adjust the pressing force based on the result of detection by a plurality of detecting parts.

It is preferable that colorimetric measurement of the print pattern is performed when all pressing forces detected by the plurality of detecting parts are within a predetermined range of pressing forces. It thereby becomes possible to press the medium using a more appropriate pressing force and perform colorimetric measurement.

A color measurement method, including:
  causing a pressing medium to press a medium using power outputted by a power source;
  detecting a pressing force on the medium when the pressing member has moved to a position at which the medium is pressed; and
  controlling the power source so that the detected pressing force is equal to a predetermined pressing force, and performing colorimetric measurement of a print pattern printed on the medium. It thereby becomes possible to press the medium using an appropriate pressing force and perform colorimetric measurement.

Overview of Printer 1 Including Color Measurement Device

Figure 2:
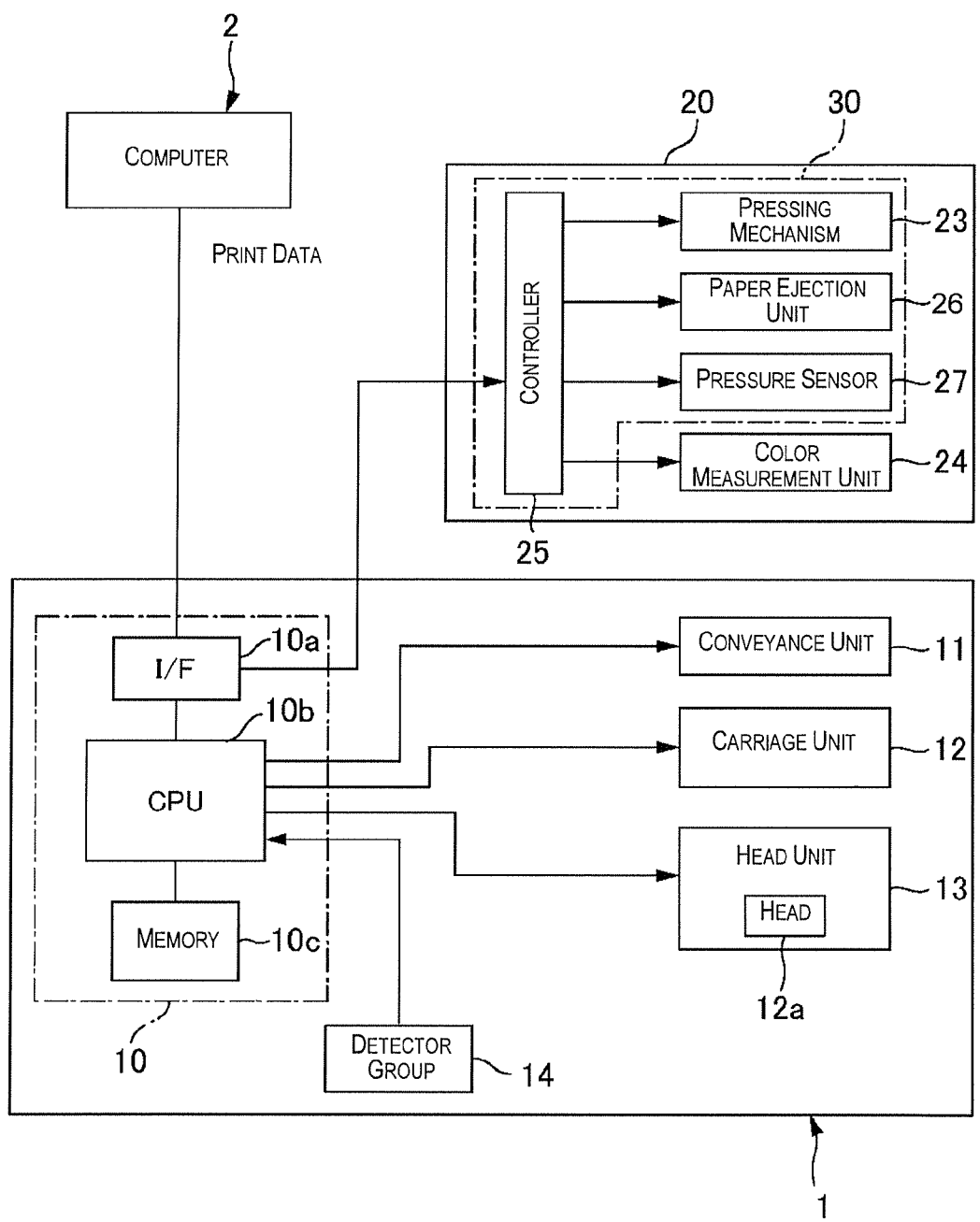
FIG. 2 is a block diagram of the overall configuration of a printer 1 including the color measurement device according to the present embodiment.
Figure 3:
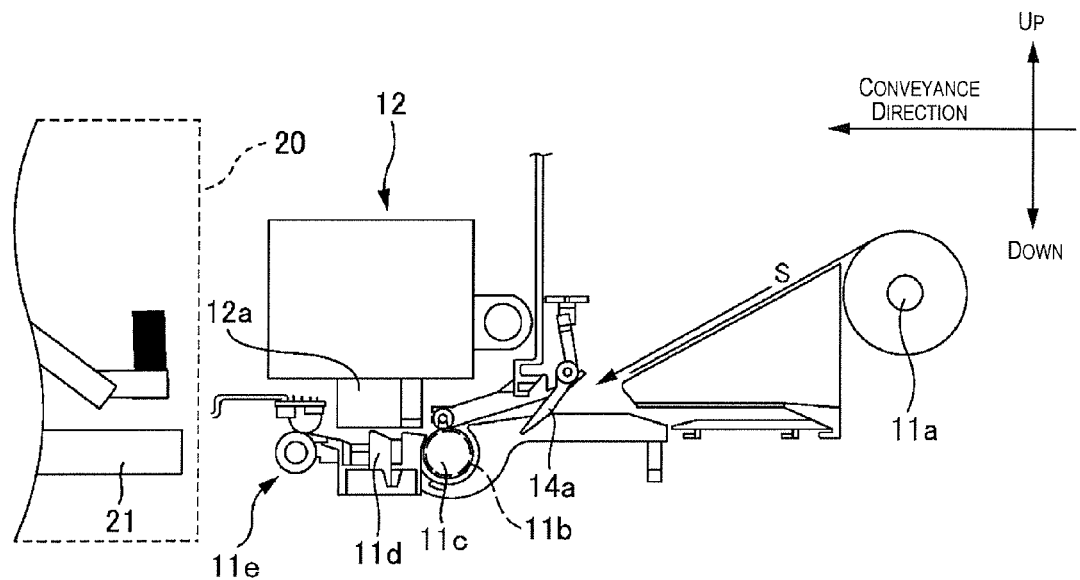
FIG. 3 is a vertical cross-section view showing the configuration of the printer 1 according to the present embodiment.

FIG. 1 is a perspective view of a printer including a color measurement device according to the present embodiment. FIG. 2 is a block diagram of the overall configuration of a printer 1 including the color measurement device according to the present embodiment. FIG. 3 is a vertical cross-section view showing the configuration of the printer 1 according to the present embodiment. First, a brief description will be given for a basic configuration of the printer including the color measurement device according to the present embodiment. As shown in FIG. 3, the color measurement device 20 is disposed downstream, relative to a paper discharge roller unit 11, in the conveyance direction in the printer 1.

An inkjet printer (hereafter referred to as "printer") 1 for ejecting ink from nozzles will be used as an example of a printing device including a color measurement device 20 according to the present embodiment, the color measurement device 20 being provided to the inkjet printer as an option as shown in FIG. 1. The embodiment will be described in relation to a printing system in which a computer 2 is connected to the printer 1 including the color measurement device 20, the color measurement device 20 having a paper-pressing device 30, as shown in FIG. 2.

Configuration of Printer 1

As shown in FIG. 2, the printer 1 according to the present embodiment receives print data from the computer 2, which is an external device; controls each unit (i.e., a conveyance unit 11, a carriage unit 12, and a head unit 13) using a control part 10; and forms an image on a paper sheet S, which is a medium. A detector group 14 monitors the situation in the printer 1, and the control part 10 controls each of the units based on results of detection.

The control part 10 is a control unit for controlling the printer 1. An interface part 10a is used for performing transmission/reception of a signal between the printer 1 and the computer 2 and between the printer 1 and the color measurement device 20, the computer 2 and the color measurement device 20 being external devices. A memory 10c is used for providing a region for holding programs, a task region, or another region for a CPU 10b. The CPU 10b controls, for example, the conveyance unit 11 and the carriage unit 12, according to a computer program (such as firmware) recorded in the memory 10c.

The conveyance unit 11 is for conveying, during printing, the paper sheet S by a predetermined conveyance amount in the conveyance direction after the paper sheet S is fed to a position at which printing can be performed, as shown in FIG. 3. The conveyance unit 11 has a paper feed roll 11a, a conveyance motor 11b, a conveyance roller 11c, a platen 11d, and a paper discharge roller unit 11e. The paper feed roll 11a is caused to rotate, and the paper sheet S to be printed on is sent to the conveyance roller 11c. When a paper detection sensor 14a detects a front-end position of the paper sheet S that has been sent from the paper feed roll 11a, the control part 10 causes the conveyance roller 11c to rotate and positions the paper sheet S at a printing start position. When the paper sheet S is positioned at the printing start position, at least some nozzles on a head 12a are opposite the paper sheet S.

The carriage unit 12 is used for moving the head 12a along an intersecting direction (hereafter also referred to as "direction of movement"), which intersects with the conveyance direction. The printer 1 is capable of ejecting ink from each of the nozzles when the head 12a is moving in either direction along the direction of movement.

The printer 1 according to the present embodiment is capable of printing a variety of types of print patterns based on print data transmitted from the computer 2 or print data that is internally held. An example of a print pattern is a print pattern for adjusting the density or adjusting the print position of the printer 1. A plurality of subpatterns are arranged in a direction that intersects with the conveyance direction of the paper sheet S.

Configuration of Color Measurement Device 20

Figure 4:
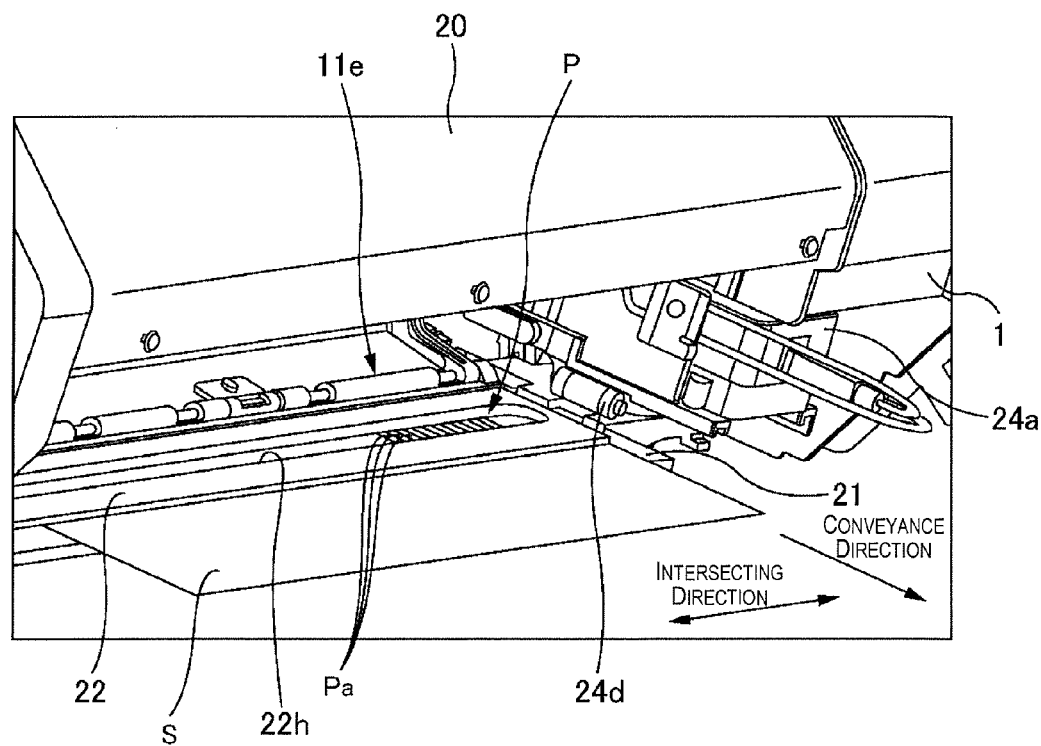
FIG. 4 is a perspective view of the color measurement device according to the present embodiment as viewed from a side towards a paper ejection unit of the printer.

FIG. 4 is a perspective view of the color measurement device according to the present embodiment as viewed from a side towards a paper ejection unit of the printer.

The color measurement device 20 according to the present embodiment is configured so that the paper sheet S discharged from the paper discharge roller unit 11e of the printer 1 is conveyed to a colorimetric measurement position of the color measurement device 20 as shown in FIGS. 3 and 4, so that colorimetric measurement can be performed on a print pattern P that has been printed in the printer 1. In the print pattern P according to the present embodiment, a plurality of subpatterns Pa having colors and densities that differ are arranged along the intersecting direction, which intersects with the conveyance direction of the paper sheet S. The color measurement device 20 performs colorimetric measurement of each of the subpatterns Pa at the colorimetric measurement position, which is downstream relative to the paper discharge roller unit 11e of the printer 1. Labels indicating the subpatterns Pa are partially omitted from FIG. 4.

Figure 5:
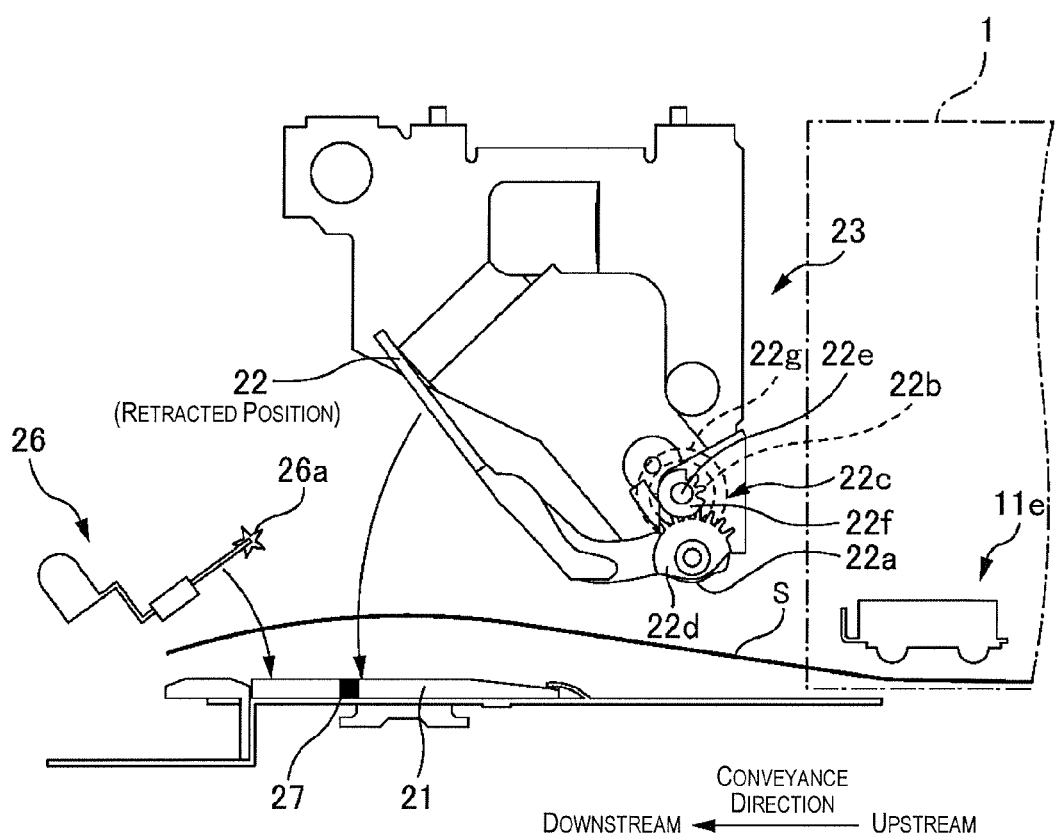
FIG. 5 is a drawing showing an overview of a configuration of a pressing mechanism.
Figure 6:
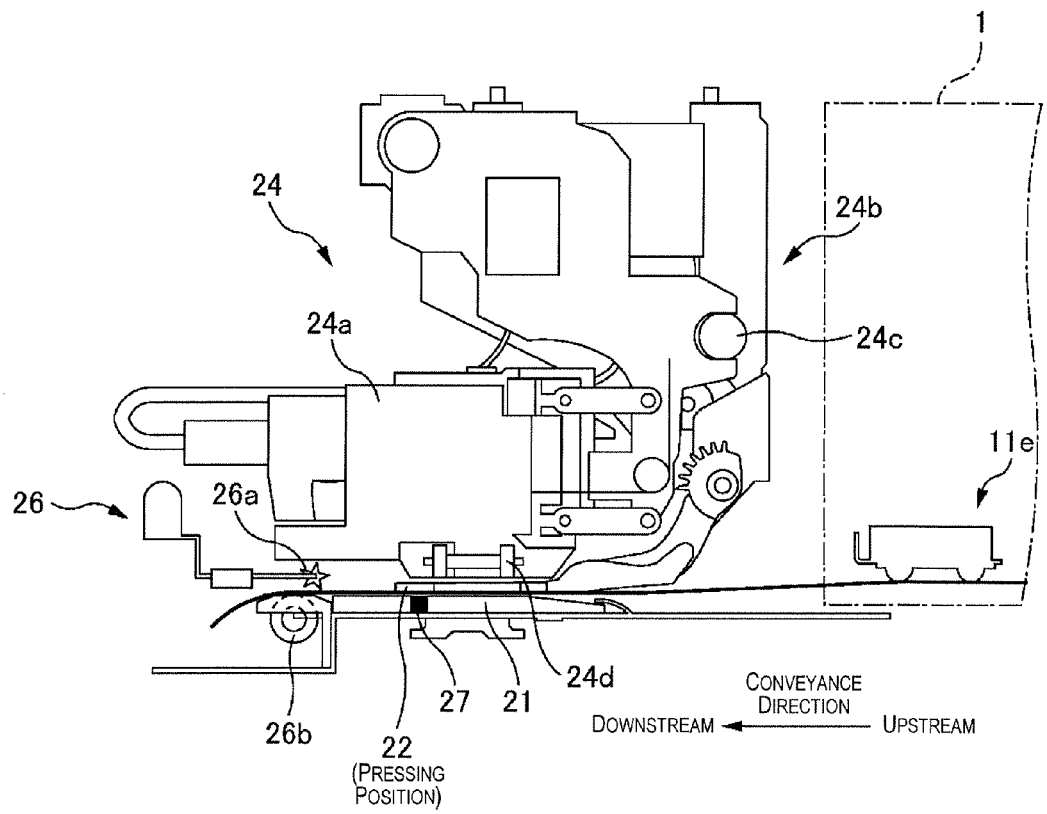
FIG. 6 is a drawing showing an overview of a configuration of a color measurement unit.
Figure 7:
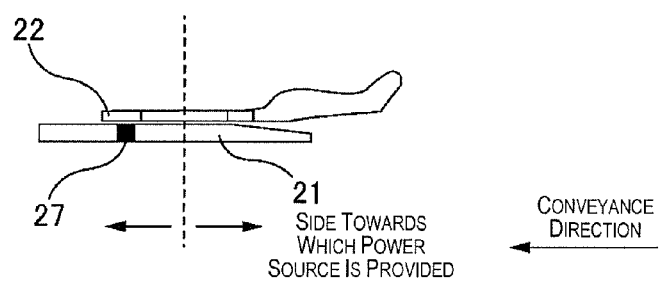
FIG. 7 is a first schematic diagram of a position at which a pressure sensor 27 is provided.

FIG. 5 is a drawing showing an overview of a configuration of a pressing mechanism. FIG. 6 is a drawing showing an overview of a configuration of a color measurement unit. FIG. 7 is a first schematic diagram of a position at which a pressure sensor 27 is provided.

As shown in FIGS. 5 and 6, the color measurement device 20 includes a conveyance guide 21, a paper-pressing member 22, a pressing mechanism 23, a color measurement unit 24, a controller 25 (see FIG. 2), and a paper ejection unit 26. The conveyance guide 21 is a member for guiding the paper sheet S that is discharged from the printer 1. The paper-pressing member 22 is a member that functions as a pressing member for pressing the paper sheet S on the conveyance guide 21 towards the conveyance guide 21. The pressing mechanism 23 is a mechanism for moving the paper-pressing member 22 between a pressing position (i.e., a position at which the paper-pressing member 22 presses the paper sheet S) and a retracted position (i.e., a position at which the paper-pressing member 22 has retracted). The color measurement unit 24 performs colorimetric measurement of the print pattern P printed on the paper sheet S. The controller 25 controls the pressing mechanism 23 and the color measurement unit 24 of the color measurement device 20. The paper ejection unit 26 discharges the paper sheet S on which colorimetric measurement has been performed.

The conveyance guide 21 is a plate-shaped member provided downstream, relative to the paper discharge roller unit 11e of the printer 1, in the conveyance direction. The conveyance guide 21 is provided at a position that is slightly lower than a position at which the paper sheet S is discharged from the paper discharge roller unit 11e. The conveyance guide 21 is formed so as to be significantly wider than the width of the paper sheet S in the intersecting direction. The position to which the paper sheet S is conveyed and at which colorimetric measurement is performed on the paper sheet S is formed so as to be flat.

The conveyance guide 21 is provided with a pressure sensor 27 (corresponding to a detecting part). The pressure sensor 27 detects a pressing force from the paper-pressing member 22 (described further below). In the present embodiment, the pressure sensor 27 is configured by a strain gauge. The pressure sensor 27 is connected to the controller 25. The pressure sensor 27 is embedded in the conveyance guide 21 so that the surface of the pressure sensor 27 is exposed, and is formed so that the point over which the paper sheet S passes on the conveyance guide 21 is flat.

FIG. 7 will now be referenced in order to specify the arrangement of the pressure sensor 27 in further detail. In FIG. 7, the pressure sensor 27 is provided on the conveyance guide 21 on a side towards the front end of the paper-pressing member 22. Specifically, in an instance in which the paper-pressing member 22 is hypothetically divided into two in the conveyance direction of the paper sheet S, the pressure sensor 27 is provided to a position corresponding to a part of the paper-pressing member 22 that is further on the downstream side.

The paper-pressing member 22 is a plate-shaped member having a rectangular profile, and is disposed so that the longitudinal direction follows along the intersecting direction. An opening 22h (see FIG. 4) is formed on the paper-pressing member 22 along the intersecting direction. The paper-pressing member 22 is formed so as to have a width in the intersecting direction that is wider than the width of the paper sheet S to be conveyed. The opening 22h is formed so as to be slightly narrower than the width of the paper sheet S in the intersecting direction. Therefore, in an instance in which the paper sheet S conveyed onto the conveyance guide 21 is pressed by the paper-pressing member 22, a portion of the paper sheet S on which the print pattern P has been printed is exposed through the opening 22h.

The pressing mechanism 23 has a rotating shaft 22a, a DC motor 22b, and a gear train 22c. The rotating shaft 22a is provided to an edge part, on an upstream side in the conveyance direction, of the paper-pressing member 22, so that a longitudinal direction follows along the intersecting direction. The rotating shaft 22a is provided so as to be capable of rotating about the longitudinal direction. The paper-pressing member 22 is mounted on the rotating shaft 22a. When the rotating shaft 22a rotates, the paper-pressing member 22 rotates about the rotating shaft 22a. The DC motor 22b is a drive source for causing the rotating shaft 22a to rotate, The DC motor is controlled by the controller 25. The gear train 22c is a gear train for transmitting the power from the DC motor 22b to the rotating shaft 22a. The gear train 22c has a first gear 22d provided at one end part of the rotating shaft 22a, and a second gear 22f provided to a motor shaft 22e. The motor shaft 22e corresponds to an output part of the DC motor 22b. The first gear 22d and the second gear 22f are configured so as to have a reduction ratio of approximately 1/40. The gear train 22c corresponds to a transmitting part for reducing, and transmitting to the paper-pressing member 22, the power from the DC motor 22b. In other words, the gear train 22c corresponds to a transmitting part for decreasing the displacement of the motor shaft 22e of the DC motor 22b and displacing the paper-pressing member 22, while also increasing the displacement of the paper-pressing member 22 and displacing the motor shaft 22e. There is also provided an encoder 22g, which is a detecting part for detecting the rotational displacement of the motor shaft 22e.

If an electric current flowing in a predetermined direction is fed to the DC motor 22b while the paper-pressing member 22 is in the retracted position, the paper-pressing member 22 moves about the rotating shaft 22a so as to face an upper surface of the conveyance guide 21, and a lower surface of the paper-pressing member 22 and the upper surface of the conveyance guide 21 are opposite each other. If the electric current flowing in the predetermined direction continues to be fed to the DC motor 22b after the paper-pressing member 22 and the conveyance guide 21 are opposite each other, there will be generated a pressing force (i.e., a torque) with which the paper-pressing member 22 presses the conveyance guide 21. If an electric current flowing in an opposite direction relative to the predetermined direction is fed to the DC motor 22b, the paper-pressing member 22 moves about the rotating shaft 22a in a direction away from the upper surface of the conveyance guide 21.

The color measurement unit 24 has a color measurement section 24a, formed by a light sensor linked to the controller 25; and a color measurement-part-moving mechanism 24b for moving the color measurement section 24a in the intersecting direction. The color measurement section 24a has, e.g., a light-emitting part and a light-receiving part, and performs colorimetric measurement based on the amount of light received by the light-receiving part, the light having been emitted by the light-emitting part and reflected by the print pattern P.

In the color measurement-part-moving mechanism 24b, a color measurement-part-moving motor (not shown) for moving the color measurement section 24a in the intersecting direction is provided so that a torque from the color measurement-part-moving motor is transmitted to a belt (not shown) that is secured to the color measurement section 24a, and the color measurement section 24a is provided so as to be capable of movement in both directions along a guide shaft 24c for guidance along the intersecting direction. The position of the color measurement section 24a is controlled using a pulse motor as the color measurement-part-moving motor (not shown), or an encoder or a similar device. Therefore, the controller is capable of specifying the subpatterns Pa subjected to colorimetric measurement, based on the amount of movement of the color measurement section 24a.

A movement roller 24d is provided to a lower end of the color measurement section 24a. The movement roller 24d rolls over in contact with the paper-pressing member 22 when the color measurement section 24a moves, and moves on the paper-pressing member 22 while being guided by the paper-pressing member 22. The color measurement section 24a performs colorimetric measurement of the print pattern P, which is exposed through the opening 22h of the paper-pressing member 22, when running over and travelling on the paper-pressing member 22 pressing the paper sheet S. When the paper-pressing member 22 releases the pressing (i.e., when the paper-pressing member 22 moves to the retracted position), the color measurement section 24a retracts from above the paper-pressing member 22 to an external region. Therefore, the guide shaft 24c extends beyond the width of the paper-pressing member 22 in the intersecting direction so that the color measurement section 24a can retract from being on the paper-pressing member 22. In other words, the color measurement section 24a is capable of moving between a region on the paper-pressing member 22, where the color measurement section 24a is disposed when colorimetric measurement is being performed; and a region outside the paper-pressing member 22 in the intersecting direction, where the color measurement section 24a is disposed when colorimetric measurement is not being performed. Each process performed by the controller 25 will be described further below.

The paper ejection unit 26 is a pair of upper and lower rollers 26a, 26b provided downstream relative to the colorimetric measurement position. The lower roller 26b is controlled by the controller 25 and the paper sheet S is conveyed.

Pressing-Force-Setting Process

Figure 8:
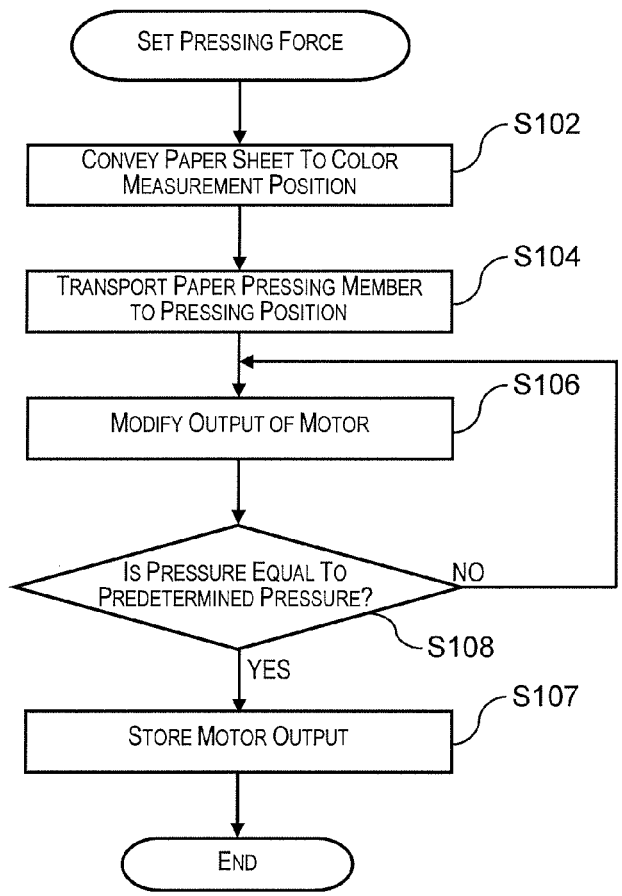
FIG. 8 is a flow chart used to illustrate a pressing-force-setting process.

FIG. 8 is a flow chart used to illustrate a pressing-force-setting process. First, the paper sheet S is conveyed to the colorimetric measurement position, and the conveyance guide 21 is caused to support the paper sheet S (S102). Next, the paper-pressing member 22 is moved to the pressing position (S104). Then, the output of the DC motor 22b is gradually increased (S106).

Figure 9:
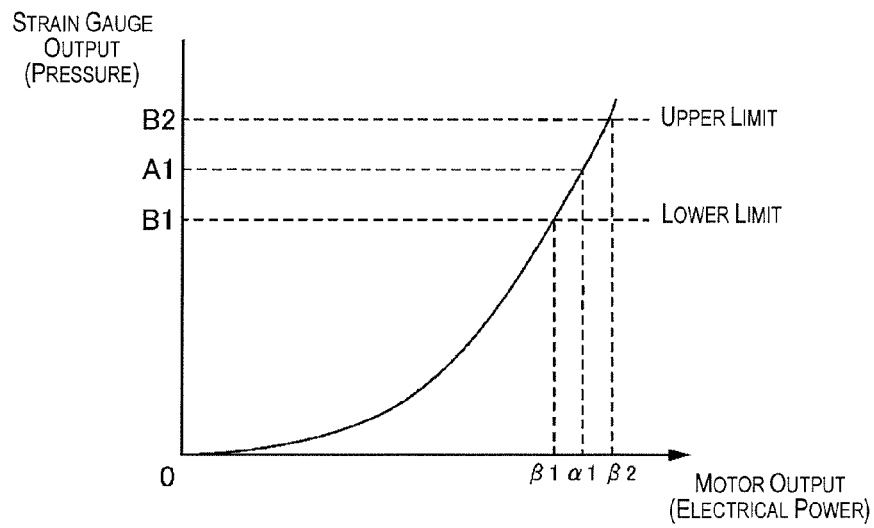
FIG. 9 is a drawing showing a relationship between motor output and strain gauge output in the present embodiment.

FIG. 9 is a drawing showing a relationship between motor output and strain gauge output in the present embodiment. The motor output shown here is the output (electrical power) of the DC motor 22b, and the strain gauge output is the output of the strain gauge in the pressure sensor 27. Thus, even when the output of the DC motor 22b is increased, in an initial stage, the power from the output is used to remove any curling in the paper sheet S, and a rise in the strain gauge output is therefore delayed. Subsequently, as the output of the DC motor 22b is increased, the output of the strain gauge begins to also increase.

In the present embodiment, the pressure is adjusted so that the strain gauge output becomes equal to A1 (S108). Accordingly, a motor output $\alpha 1$, at which the output of the strain gauge reaches A1 as the output of the DC motor 22b is gradually increased, is recorded (S110). It thereby becomes possible to continuously press the paper sheet S at an appropriate pressure and perform colorimetric measurement by using the motor output $\alpha 1$ in relation to the paper sheet S.

In the above description, a recording is made for a motor output at which the output of the strain gauge is equal to A1. However, a predetermined range of motor outputs $\beta 1$ to $\beta 2$, within which the output of the strain gauge is in a range of B1 to B2, may also be recorded.

A reason for setting the pressing force is to address any effect arising from curling or other adverse circumstances in the paper sheet itself, depending on the type of the paper sheet S. In an instance in which, e.g., the paper sheet S is a thick paper sheet, if the paper sheet is fed from a roll as in the present embodiment, the curling in the paper sheet S itself cannot be readily removed. Under such circumstances, there may be an instance in which the paper sheet S cannot be pressed into a flat state if the pressing mechanism 23 is driven using the same electrical power as that used in an instance of a thin paper sheet. Alternatively, if the pressing mechanism 23 is driven using an excessive amount of electrical power, not only will the paper sheet S be pressed to an excessive degree and colorimetric measurement become impossible to perform in an appropriate manner, but a problem will be presented in regard to the power being wasted by unnecessary current.

Also, in relation to characteristics of the DC motor 22b, there may be an instance in which a variation in the product causes the power output to be inconsistent even if the same electrical power is fed.

Therefore, in the present embodiment, a configuration is used in which the paper sheet S can be pressed using an appropriate pressing force as described above.

Color Calibration Process

Figure 10:
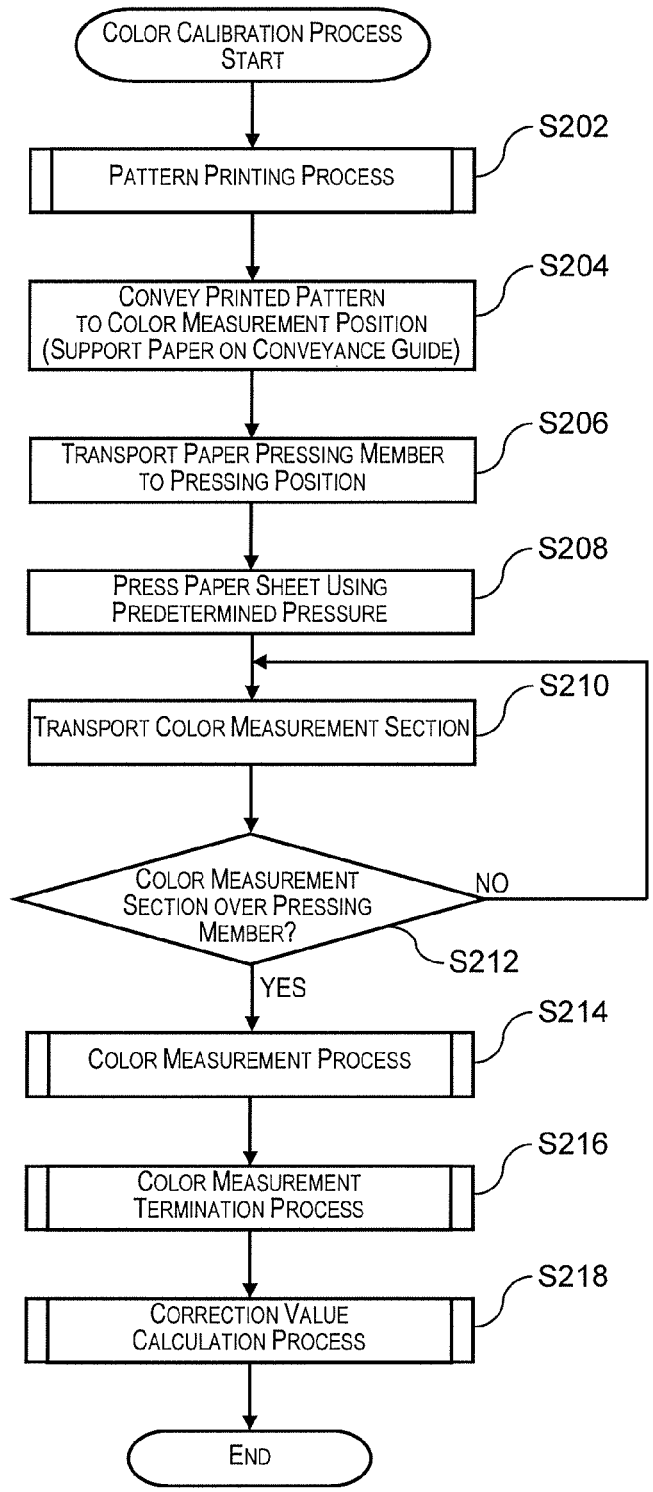
FIG. 10 is a flow chart used to illustrate a color calibration process.

FIG. 10 is a flow chart used to illustrate a color calibration process. An operation of the paper-pressing member 22 and other components will now be described in further detail, and a procedure for the color calibration process will also be described.

First, the printer 1 executes printing of the print pattern P (i.e. pattern printing process, S202). Printing of the print pattern P can be performed using a known printing technique by the printer 1. Therefore, a description of the printing of the print pattern P will be omitted here. The printer 1 prints, on the paper sheet S, a print pattern P in which a plurality of subpatterns Pa are arranged in the intersecting direction, as the print pattern P.

Next, the printer 1 conveys the paper sheet S until the print pattern P on the paper sheet S reaches the colorimetric measurement position, and causes the conveyance guide 21 to support the paper sheet S (S204). Here, the paper-pressing member 22 is at the retracted position as shown in FIG. 5. When the print pattern P reaches the colorimetric measurement position of the color measurement device 20, the printer 1 discontinues conveyance of the paper sheet S. There may be an instance in which the conveyed paper sheet S lifts off the conveyance guide 21 as shown in FIG. 5. If the color measurement unit 24 performs colorimetric measurement of the print pattern P in a state of such description, there is a risk that the distance between the color measurement section 24a and the print pattern P becomes inconsistent, and that the colorimetric measurement cannot be performed in an accurate manner.

Therefore, next, the color measurement device 20 conveys the paper-pressing member 22 to the pressing position, and inhibits the paper sheet S from lifting off the conveyance guide 21 (S206). Here, the controller 25 of the color measurement device 20 drives the DC motor 22b and moves the paper-pressing member 22, which is at the retracted position, to the pressing position (see FIG. 6). The power of the DC motor 22b is transmitted to the rotating shaft 22a via the gear train 22c. The paper-pressing member 22 moves about the rotating shaft 22a so as to be opposite the upper surface of the conveyance guide 21, and the lower surface of the paper-pressing member 22 and the upper surface of the conveyance guide 21 are opposite each other. The paper sheet S is sandwiched between the lower surface of the paper-pressing member 22 and the upper surface of the conveyance guide, whereby the print pattern P exposed through the opening 22h of the paper-pressing member 22 is corrected so as to be flat even if there is a curl in the paper sheet S. The controller 25 detects the arrival of the paper-pressing member 22 at the pressing position, based on the result of detection by the encoder 22g.

Next, the DC motor 22b is driven using the motor output α1 that has been recorded in the process described further above, and the paper sheet S is pressed by the paper-pressing member 22 (S208). The paper sheet S is thereby pressed by a pressing force that is suitable for colorimetric measurement. The DC motor 22b may also be driven using a motor output within the predetermined range of β1 to β2.

If the controller 25 causes the DC motor 22b to stop after the paper-pressing member 22 has moved to the pressing position, there is a risk of the paper sheet S pressing the paper-pressing member 22 upwards and the paper sheet S lifting back off the conveyance guide 21. Therefore, the controller 25 continues to feed a predetermined electrical current to the DC motor 22b and causes the DC motor 22b to continue outputting power by which the paper-pressing member 22 presses the paper sheet S. The paper sheet S is thereby prevented from lifting off the conveyance guide 21.

Next, the controller 25 causes the color measurement section 24a to move (S210). The color measurement section 24a at the start of movement is disposed in a region to the outside of the paper-pressing member 22. If the color measurement section 24a continues to move ("No" at S212, then S210), the color measurement section 24a reaches a location above the paper-pressing member 22. If the controller 25 determines the color measurement section 24a to be positioned above the paper-pressing member 22 ("Yes" at S212), the controller 25 performs the color measurement process.

Next, the controller 25 executes the color measurement process while causing the paper-pressing member 22 to press the paper sheet S (S214). Here, the controller 25 causes the color measurement section 24a to move on the paper-pressing member 22 while causing the paper-pressing member 22 to guide the movement roller 24d. The controller 25 causes the color measurement section 24a to perform colorimetric measurement of the print pattern P that is exposed through the opening 22h of the paper-pressing member 22. Since the color measurement section 24a moves while the movement roller 24d is rolling on the paper-pressing member 22 as the paper-pressing member 22 is pressing the paper sheet S, the distance between the color measurement section 24a and the print pattern P is kept fixed. Colorimetric measurement can therefore be performed in an accurate manner.

After the color measurement process has ended, the controller 25 executes a color measurement completion process (S216). Specifically, the controller 25 causes the color measurement section 24a to move to a region to the outside of the paper-pressing member 22, causes the paper-pressing member to move to the retracted position, and then causes the paper sheet S to be discharged.

Finally, the control part 10 of the printer 1 calculates a corrective value for color calibration based on the result of the colorimetric measurement obtained in the color measurement process (i.e., in the S214), and stores the corrective value in the memory 10c (S218). The corrective-value-calculating process can be performed using a known color calibration technique, and a description shall therefore not be provided.

It is thereby possible to press the paper sheet S using an appropriate pressing force and perform colorimetric measurement. Although the pressing-force-setting process and the color calibration process were described individually, these processes can also be made to perform as a single joined process. Specifically, steps S106 through S108 of the pressing-force-setting process can be made to perform at step S208 of the color calibration process. It also thereby becomes possible to set an appropriate pressing force each time colorimetric measurement is performed.

Figure 11:
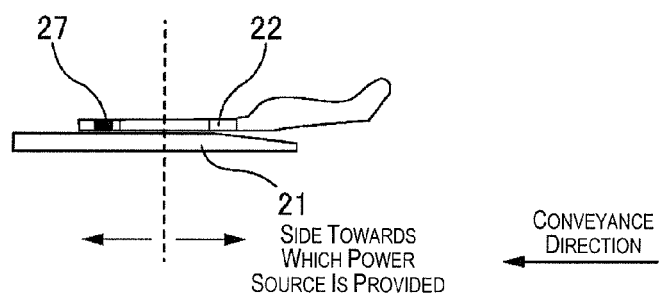
FIG. 11 is a second schematic diagram of a position at which the pressure sensor 27 is provided.

FIG. 11 is a second schematic diagram of a position at which the pressure sensor 27 is provided. In the embodiment described above, the pressure sensor 27 is provided in the conveyance guide 21. However, the pressure sensor 27 may also be provided in the paper-pressing member 22.

Figure 12:
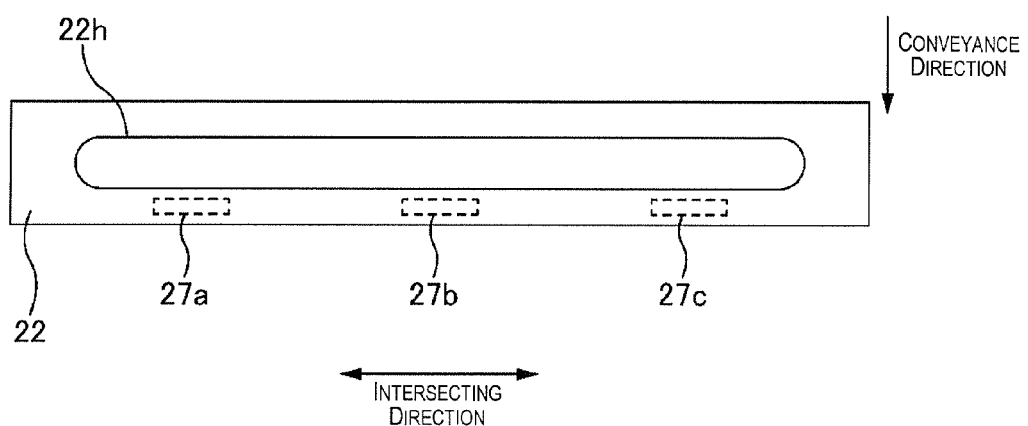
FIG. 12 is a third schematic diagram of a position at which the pressure sensor 27 is provided.

FIG. 12 is a third schematic diagram of a position at which the pressure sensor 27 is provided. In the embodiment described above, only a single pressure sensor 27 is provided at a center, in the width direction of the paper (i.e., the intersecting direction), of the paper-pressing member 22. However, such an arrangement is not provided by way of limitation. For example, a plurality of pressure sensors 27a through 27c may be provided in the intersecting direction as shown in FIG. 12. A configuration is also possible in which the pressing force on the paper sheet S is deemed to be appropriate when pressure values obtained from all of the pressure sensors 27a through 27c are within a predetermined range, and the motor output of the DC motor 22b at the corresponding point is recorded and used.

The pressure sensor 27 may be in such a position so as to be disposed at a location at which the pressure is equal to an average pressure on the entire sheet, taking the location at which pressure is applied and the body to which pressure is applied into consideration. Also, the position of the pressure sensor 27 may be so that the sensor is disposed at a location at which the accuracy of colorimetric measurement has the greatest effect on colorimetric measurement.

The pressing-force-setting process described above is preferably performed each time the type of paper is changed. Also, the motor output (i.e., electrical power) for each type of paper may be recorded.

What is claimed is:

1. A color measurement device for performing colorimetric measurement of a print pattern printed on a medium, the color measurement device comprising:
    a pressing member for pressing the medium in a pressing position;
    a power source for outputting power for the pressing member to press the medium;
    a pressure sensor for detecting a pressing force of the pressing member on the medium;
    a color measurement section for performing colorimetric measurement of the print pattern; and
    a control part for, as the pressing member is in the pressing position, changing an output of the power source in order to set the pressing force to be a predetermined pressing force, for recognizing, as a specified output, the output when the pressing force detected by the pressure sensor is equal to the predetermined pressing force, and for causing the color measurement section to perform colorimetric measurement of the print pattern printed on the medium pressed by the pressing member with the specified output.

2. The color measurement device according to claim 1, wherein
    the control part further records the specified output.

3. The color measurement device according to claim 1, wherein
    the pressure sensor is provided at a position opposite the pressing member.

4. The color measurement device according to claim 1, wherein
    the pressure sensor is provided to the pressing member.

5. The color measurement device according to claim 1, wherein
    the pressure sensor is provided on a surface where the pressing member comes into contact with the medium;

and is provided to a side of the surface set apart from where the power source is disposed, in a direction along which the medium is conveyed.

6. The color measurement device according to claim 1, wherein
a plurality of the pressure sensors are provided in a direction that intersects a direction along which the medium is conveyed.

7. The color measurement device according to claim 6, wherein
colorimetric measurement of the print pattern is performed when all pressing forces detected by the plurality of pressure sensors are within a predetermined range of pressing forces.

8. A color measurement method, comprising:
causing a pressing medium to press a medium in a pressing position using power outputted by a power source;
detecting a pressing force of the pressing member on the medium as the pressing member is in the pressing position;
setting the power source based on the detected pressing force and the power outputted by the power source as the pressing member is in the pressing position by changing an output of the power source in order to set the pressing force to be a predetermined pressing force, and recognizing, as a specified output, the output when the pressing force is equal to the predetermined pressing force; and
performing colorimetric measurement of a print pattern printed on the medium by pressed by the pressing member with the specified output.

\* \* \* \* \*